July 10, 1945.    G. B. WARREN    2,380,276
WELDED STRUCTURE
Filed Jan. 3, 1944
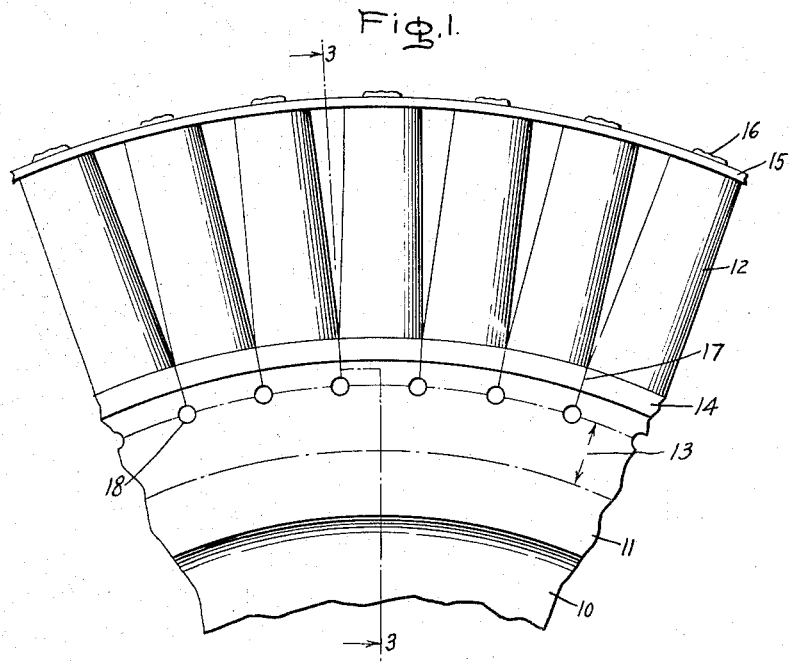
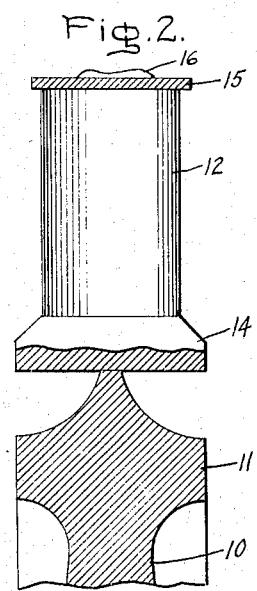
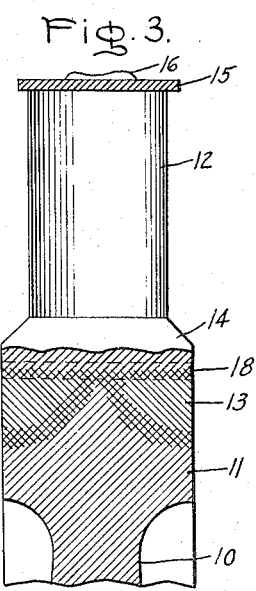
Inventor:
Glenn B. Warren,
by Harry E. Dunham
His Attorney.

Patented July 10, 1945

2,380,276

UNITED STATES PATENT OFFICE 2,380,276

WELDED STRUCTURE

Glenn B. Warren, Schenectady, N. Y., assignor to General Electric Company, a corporation of New York Application January 3, 1944, Serial No. 516,873

7 Claims. (Cl. 253—77)

My invention relates to assemblies embodying cast metal joints and more particularly to welded blade assemblies for elastic fluid turbines.

In an elastic fluid turbine, blade assemblies are employed for directing a stream of elastic fluid through the turbine and converting its available energy into mechanical energy. The blades of these assemblies may form the partitions of a nozzle diaphragm or they may form the buckets of a bucket wheel. Where the blade bases are not sufficiently enlarged to space them relatively to one another, other additional members may be used as spacers or reenforcements in the blade assembly.

These blades and the members associated therewith must be securely held in place relative to one another and the surface of a support member on which they are mounted. If the union of these elements is accomplished by a casting or welding process, the cast metal joint employed must produce a rigid structure which will withstand the strains set up therein by the substantial temperature changes which are continually going on in the turbine due to changes in load and the resultant changes in the quantity of flow of hot elastic fluid through the turbine. Furthermore, in the case of a rotating part, such as a bucket wheel, the cast metal joint must withstand without failure the various radial and tangential stresses resulting from the centrifugal forces generated therein by its speed of rotation.

If the side surfaces of the blade bases or these blade bases and their spacers are brought into abutting engagement with one another to resist rocking movement or displacement due to the forces generated by the flow of elastic fluid through the turbine, a cast metal joint between the ends of these elements and their support is subject to the danger of failure due to cracks or fissures developing therein where the cracks formed by the abutting surfaces of these elements run into the cast metal joint. Where each crack intersects the cast metal joint there is a pronounced notch effect which causes a concentration of stresses in the cast metal joint which either causes failure of the cast metal joint or promotes crack growth therethrough which ultimately results in failure of the cast metal joint.

It is an object of my invention to provide a construction which eliminates the notch effect of a crack running into a weld or cast metal joint between members whose abutting surfaces form such a crack.

It is a further object of my invention to provide turbine structure which eliminates the high stress condition that occurs where the joint between abutting members of a blade assembly terminates in a weld or cast metal joint which connects these members to their support.

More specifically, it is an object of my invention to provide a bucket wheel in which the ends of abutting blade bases are joined to the rim of a wheel by a cast metal joint which intersects the crack between abutting bucket bases along curved surfaces forming walls of a hole or perforation formed partly in the abutting portions of the bucket bases and partly in the cast metal joint.

Further objects of my invention will become apparent from a consideration of the bucket wheel structure illustrated in the accompanying drawing and the following description of suitable processes of manufacturing it.

In this drawing Fig. 1 is a side elevation of a portion of a bucket wheel embodying my invention, Fig. 2 is a radial view of the assembly of buckets on the rim of the bucket wheel prior to welding, and Fig. 3 is a radial sectional view thereof taken along lines 3—3 of Fig. 1.

In the bucket wheel illustrated in the drawing the blade assembly is attached to the rim of a wheel by a circumferential weld. This blade assembly comprises a plurality of buckets having base portions whose side surfaces abut one another forming radial cracks running into one side of this weld. In accordance with my invention this weld is protected against the extension of these cracks by the provision of holes or perforations formed partly in the abutting portions of the bucket bases and partly in the weld. The curved or rounded surfaces of the side walls of these perforations decentralize the concentration of stresses at the inner terminal of the crack between abutting blade bases and prevent this crack from extending into the weld.

As shown in the accompanying drawing 10 indicates the web of a wheel or rotor of a turbine bucket wheel and 11 the flanged rim thereof. A plurality of buckets 12 are radially disposed about the rim 11 of the bucket wheel and attached thereto by a circular weld 13. This weld integrally connects the ends of the base portions 14 of buckets 12 to the supporting surface of rim 11 of the bucket wheel. The outer ends of buckets 12 are provided with a cover or shroud band 15 which may be suitably secured to the bucket ends as by means of riveted tenons 16.

The adjacent side surfaces of bucket bases 14 abut one another forming cracks 17 which extend radially into one side of weld 13. The notch effect and concentration of stresses produced where cracks 17 run into weld 13 are eliminated in accordance with my invention by means of holes or perforations 18 formed partly in bucket bases 14 and partly in weld 13. The curved or rounded surfaces of the side walls of these perforations decentralize the concentration of stresses at the inner terminal of a crack between abutting bucket bases and, consequently, eliminates any tendency of the crack between bucket bases to extend itself into weld 13.

As shown in Fig. 2, the ends of bucket bases 14 and the edge surface of rim 11 of the bucket wheel are suitably prepared and assembled relative to one another for the welding operation by means of which they are connected. It will be noted that the rim of the bucket wheel has its outer edge portions cut away to form a central projection against which the square ends of the bucket bases rest when assembled for the welding operation. With this assembly, grooves are formed on opposite sides of rim 11 of the bucket wheel and between the bucket wheel and the inner ends of bucket bases 14. Weld metal is then deposited in these grooves until they are filled and complete a cast metal joint coextensive with the width of the wheel rim and the bucket bases.

Any suitable welding procedure may be employed and the weld metal may be deposited by any suitable welding method. I prefer to use an arc welding procedure in which the weld metal is deposited from a fusible metallic electrode. In order to prevent the assembly from warping during the welding operation it is preferable to provide a jig in which the parts are firmly held in the desired positions relative to one another. Furthermore, it is desirable to form weld 13 by partially filling one of the grooves on one side of the assembly and then partially filling the other groove on the other side of the assembly and alternately proceeding in this manner until the welding grooves have been filled with weld metal. Alternatively, weld 13 may be formed by simultaneously depositing weld metal from opposite sides of the assembly in order to prevent undue warpage thereof during the welding operation. These and other procedures well known to those skilled in the art of welding may be employed to prevent warping of the assembly during welding.

The weld thus formed is a cast metal joint and it is obvious that other procedures may be employed for fabricating such a joint. For example, the joint may be made by assembling parts in a suitable mold and pouring molten metal into the mold to form the cast metal joint 13. Furthermore, the joint preparation may be variously modified in order to facilitate the formation of the cast metal joint.

After the cast metal joint has been made, the side surfaces of the bucket wheel are machined in order to obtain uniformity of weight distribution and to provide surfaces which are smooth and have less friction drag than the surfaces produced by casting or welding. Thereafter the notch-like intersection of radial cracks 17 with weld 13 is eliminated by drilling or otherwise forming holes or perforations 18 coextensive with the terminal portions of the cracks. The curved or rounded surfaces of the side walls of these perforations decentralize the concentration of stresses at the inner ends of the cracks and prevent extension of these cracks into the weld when the bucket wheel is subjected to temperature changes and centrifugal forces as an operating element of an elastic fluid turbine. The completed assembly is shown in Figs. 1 and 3.

It is, of course, apparent that the principle of my invention is equally applicable to the fabrication of nozzle diaphragms where the blades form partition walls constituting part of the nozzle structure. In such case the blades may be assembled with or without spacing members therebetween and the assembly completed by means of a weld or cast metal joint extending across their surfaces. In such a construction the cracks between the blades or blade bases or between the blades and their spacers will run into the weld and produce the same notch effect above considered in connection with the fabrication of a bucket wheel. In like manner this notch effect of a crack running into the weld is eliminated in accordance with my invention through the agency of a perforation or hole constituting the terminal portion of the crack formed by the abutting surfaces of the elements of the assembly. It is true that in the case of a nozzle diaphragm the structure will not be subjected to stresses resulting from centrifugal forces. It will, however, be subject to the warpng action and stresses resulting fom unequal heating and cooling of the diaphragm structure and will consequently be subject to destruction by reason of the cracks between the blade elements extending into the weld by which they are joined to their supporting structure.

Furthermore, it is obvious that holes 18 may be partly formed in the blade assembly and completely formed during the welding operation by the use of non-fusible pins which are seated in the preformed hole surface of the blade assembly. Other arrangements will occur to those skilled in the art for obtaining the resulting structure above described as embodying my invention.

While I have shown and described but one embodiment of my invention, it is apparent that other embodiments thereof will occur to those skilled in the art and I, therefore, intend to cover by the appended claims all such modifications of my invention which fall within the true spirit and scope thereof.

What I claim as new and desire to secure by Letters Patent in the United States is:

1. In an elastic fluid turbine, a blade carrying support, a plurality of blade bases having adjacent surfaces abutting one another, and a cast metal joint between the surface of said blade carrying member and the ends of said blade bases, said cast metal joint and said blade bases having rounded surfaces forming holes extending transversely thereof and constituting the terminal portion of the cracks formed by said abutting surfaces of said blade bases at said joint.

2. In an elastic fluid turbine, a support having a blade carrying surface, a blade assembly comprising members abutting one another; a cast metal joint forming an integral union between the ends of said members of said blade assembly and said blade carrying surface of said support, said joint at each union between abutting surfaces of said members of said blade assembly having a perforation extending transversely thereof and forming a curved surface intersecting said joint and connecting the abutting surfaces of said members.

3. In an elastic fluid turbine, a support having a circular blade carrying surface, a circular blade assembly comprising members abutting one another, a circular cast metal joint forming an integral union between the ends of said members of said blade assembly and said blade carrying surface of said support, said joint at each union between abutting surfaces of said members of said blade assembly having a perforation extending transversely thereof and forming a curved surface intersecting said joint and connecting the abutting surfaces of said members.

4. In an elastic fluid turbine, a wheel having a circular blade carrying surface, a blade ring comprising members having radial cracks therein where the abutting surfaces of said members engage one another, and a circular cast metal joint forming an integral union between the ends of said members of said blade ring and said circular blade carrying surface of said wheel, said joint and said members being connected at said radial cracks in said blade ring by curved surfaces constituting the side walls of perforations formed partly in said members and partly in said weld where said radial cracks intersect said weld.

5. An elastic fluid turbine comprising members forming a circular blade assembly having radial cracks therein where the abutting surfaces of said members engage one another, and a circular weld extending along said blade assembly and across said radial cracks therein, said members being connected at said radial cracks by curved surfaces constituting the side walls of perforations extending through said assembly and formed partly in said members and partly in said weld.

6. A welded assembly comprising a support, a plurality of members having side surfaces abutting one another, a weld forming an integral union between the ends of said members and the surface of said support, said weld and said members being connected at the abutting surfaces of said members by a curved surface constituting the side wall of a perforation formed partly in said members and partly in said weld.

7. A welded structure comprising an assembly of members having surfaces abutting one another, and a weld extending along said assembly and across each crack therein formed by the abutting surfaces of said members, said weld and said members at each crack formed in said assembly by said abutting surfaces of said members being connected by a curved surface constituting the side wall of a perforation formed partly in said members and partly in said weld.

GLENN B. WARREN.